(12) United States Patent
Karan

(10) Patent No.: US 11,932,038 B2
(45) Date of Patent: Mar. 19, 2024

(54) AUTHENTICATION SYSTEM AND METHOD

(71) Applicant: Aharon A. Karan, Glendale, WI (US)

(72) Inventor: Aharon A. Karan, Glendale, WI (US)

(*) Notice: Subject to any disclaimer, the term of this patent is extended or adjusted under 35 U.S.C. 154(b) by 752 days.

(21) Appl. No.: 17/070,402

(22) Filed: Oct. 14, 2020

(65) Prior Publication Data

US 2022/0111674 A1    Apr. 14, 2022

(51) Int. Cl.
| | | |
|---|---|---|
| *G06K 19/14* | (2006.01) | |
| *B41M 3/14* | (2006.01) | |
| *B42D 25/29* | (2014.01) | |
| *B42D 25/378* | (2014.01) | |
| *G06V 20/80* | (2022.01) | |
| *H04L 9/32* | (2006.01) | |
| *G06V 20/00* | (2022.01) | |
| *H04L 9/00* | (2022.01) | |

(52) U.S. Cl.
CPC ............. *B41M 3/14* (2013.01); *B42D 25/29* (2014.10); *B42D 25/378* (2014.10); *G06K 19/14* (2013.01); *G06V 20/80* (2022.01); *H04L 9/3236* (2013.01); *H04L 9/3247* (2013.01); *G06V 20/95* (2022.01); *H04L 9/50* (2022.05)

(58) Field of Classification Search
CPC ........ B41M 3/14; B42D 25/29; B42D 25/378; B42D 25/305; B42D 25/405; G06K 19/14; G06V 20/80; G06V 20/95; G06V 10/751; G06V 20/698; H04L 9/3236; H04L 9/3247; H04L 9/50; H04L 2209/56; G07D 7/004; G07D 7/12; G07D 7/2033; G09C 5/00

USPC .......................................................... 382/165
See application file for complete search history.

(56) References Cited

U.S. PATENT DOCUMENTS

| | | | |
|---|---|---|---|
| 6,823,075 B2 | 11/2004 | Perry | |
| 2006/0044378 A1* | 3/2006 | Kim | G01N 21/95607 347/104 |
| 2011/0155007 A1* | 6/2011 | Liu | B41M 7/0027 264/293 |
| 2012/0307271 A1* | 12/2012 | Ishitoya | B41M 5/00 358/1.9 |
| 2013/0215176 A1* | 8/2013 | Hatano | B41J 2/12 347/14 |
| 2014/0292843 A1* | 10/2014 | Fernandez del Rio | B41J 2/2132 347/21 |
| 2017/0098143 A1* | 4/2017 | Mader | G06K 15/022 |
| 2019/0057288 A1* | 2/2019 | Tokushima | G06T 7/74 |

* cited by examiner

*Primary Examiner* — Ali Bayat
(74) *Attorney, Agent, or Firm* — Boyle Fredrickson, S.C.

(57) ABSTRACT

An authentication mark system and method are provided for authentication of an object having indicia associated therewith. The authentication mark system includes an inkjet printer configured to propel microscopic ink drops onto the object to form a pattern of ink on the object. A microscope camera has a lens directable at the pattern of ink on the object. The microscope camera records an enlarged image of the pattern of ink on the object. A processor is operatively connected to the microscope camera and is configured to transmit the enlarged image of the pattern of ink and the indicia associated with the object to a database for secure storage.

22 Claims, 3 Drawing Sheets

AUTHENTICATION SYSTEM AND METHOD

FIELD OF THE INVENTION

This invention relates generally to security features for combatting counterfeiting and piracy, and in particular, to a method and an authentication mark system that facilitates the authentication of an object utilizing an authentication mark.

BACKGROUND AND SUMMARY OF THE INVENTION

The rapid growth of e-commerce has revolutionized the way goods are bought and sold, thereby allowing for counterfeit and pirated goods to flood the marketplace. It can be appreciated that illicit goods trafficked to American consumers by e-commerce platforms and online third-party marketplaces threaten public health and safety, as well as, national security. This illicit activity impacts American innovation and erodes the competitiveness of U.S. manufacturers and workers. Consumers must be confident in the safety, quality and authenticity of the products purchased.

Numerous product security features have been developed to combat counterfeiting and piracy. One type of security feature is often referred to as digital watermarking. Digital watermarking is a process for embedding a machine-readable code into media images, documents and the like. Some digital watermarking systems use cryptography to store and transmit data in a particular form so that only those for whom it is intended can read and process it. As such, these types of digital watermarking systems using cryptography not only protect media images, documents and the like from theft or alteration, but can also be used for user authentication.

By way of example, Perry, U.S. Pat. No. 6,823,075 disclosed various systems for creating and authenticating printed objects using authentication and copy detection watermarks. One verification systems in the '075 patent includes a watermark decoder and a verification module. The watermark decoder detects a copy detection watermark in a printed object to determine whether the printed object has been reproduced. The verification module processes a message decoded from an authentication watermark on the printed object to authenticate the printed object or bearer of the printed object. The authentication and copy detection watermarks may be implemented as the same or different watermarks. The copy detection watermark may be a fragile watermark that carries the message and degrades in response to a reproduction operation, such as photocopying or scanning and then reprinting of the object. Alternatively, the authentication and copy detection watermarks may be separate watermarks embedded in an image that is printed on the object. The authentication watermark, in some applications, includes an identifier that links the object to a database entry with related information about the object. This related information can be used to check the bearer of the object by comparing it with attributes of the bearer (such as a user ID or photo) or the validity of the object by comparing it with attributes that are visible or machine readable on the object.

While functional for its intended purposes, digital watermarks have certain limitations. For example, due to advances in scanning, printing and copying technology, it has become possible to reproduce copy detection watermarks without degradation. Consequently, it may no longer be possible to determine if the printed object has been reproduced simply by analyzing the copy detection watermark. Similarly, when using authentication watermarks, it is possible for the unique code stored in the database and visible or machine readable on the object to be printed on a counterfeit or pirated object. As such, the authentication watermark may lead to an individual believing a counterfeited or pirated object is authentic.

Therefore, it is a primary object and feature of the present invention to provide a method and an authentication mark system that facilitates the authentication an object utilizing an authentication mark.

It is a further object and feature of the present invention to provide an authentication mark system that is simple and inexpensive.

It is a still further object and feature of the present invention to provide a method of authenticating an object utilizing an authentication mark.

In accordance with the present invention, a method of authenticating an object is provided. The method includes the step of propelling ink droplets onto the object utilizing an inkjet printer to form an image. The ink droplets form a pattern of ink on the object. An image of the pattern of ink is captured and the captured image is compared to the pattern of ink.

The pattern of ink is magnified prior to capturing the image such that the captured image is magnified. As such, the pattern of ink is magnified prior to comparing the captured image to the pattern of ink. It is contemplated for the ink droplets to include a plurality of sets of droplets, wherein each set of droplets fabricated from a different color. The color of each set of droplets is selected from a group including black, cyan, magenta and yellow. The capture image may be stored as a digital data file and recorded to a block of a blockchain. The pattern of ink on the object may be coated with a protectant. The protectant may take the form of a transparent sheet laminated to the object and overlapping the pattern of ink.

In accordance with a further aspect of the present invention, an authentication mark system is provided for authentication of an object having indicia associated therewith. The authentication mark system includes an inkjet printer configured to propel microscopic ink drops onto the object to form a pattern of ink on the object. A microscope camera has a lens directable at the pattern of ink on the object. The microscope camera records an enlarged image of the pattern of ink on the object. A processor is operatively connected to the microscope camera and is configured to transmit the enlarged image of the pattern of ink and the indicia associated with the object to a database for secure storage.

The microscopic ink drops include first, second, third and fourth sets of microscopic ink drops deposited on the object. The first set of microscopic ink drops is a first color. The second set of microscopic ink drops is a second color. The third set of microscopic ink drops is a third color. The fourth set of microscopic ink drops is a fourth color. The first, second, third and fourth sets of microscopic ink drops define the pattern of ink on the object.

The processor is configured to transmit the enlarged image of the pattern of ink and the indicia associated with the object to a database as a digital data file which at least partially defines a block of a blockchain. A protectant overlaps the pattern of ink formed on the object. The protectant may take the form of a transparent sheet laminated to the object.

In accordance with a still further aspect of the present invention, a method of authenticating object is provided. The method includes the step of providing a unique code for each object. For each object, ink droplets are propelled onto the object utilizing an inkjet printer to form a unique pattern of ink on the object. The unique pattern of ink is magnified to provide an enlarged pattern of ink. An image of the enlarged pattern of ink is captured. The captured image and the unique code for the object are transmitted to a secure database.

The ink droplets include a plurality of sets of droplets. Each set of droplets is fabricated from a different color. The color of each set of droplets is selected from a group including black, cyan, magenta and yellow. The captured image and the unique code for each object are stored in the secured database as a digital data file. Each digital data file is recorded to a block of a blockchain. Each unique pattern of ink may be coated with a protectant, e.g., a transparent sheet. Each object may be sequentially feed into the inkjet printer prior to the step of propelling ink droplets onto the object.

BRIEF DESCRIPTION OF THE DRAWINGS

The drawings furnished herewith illustrate a preferred construction of the present invention in which the above advantages and features are clearly disclosed as well as others which will be readily understood from the following description of the illustrated embodiment.

In the drawings.

DETAILED DESCRIPTION OF THE DRAWINGS

Figure 1:
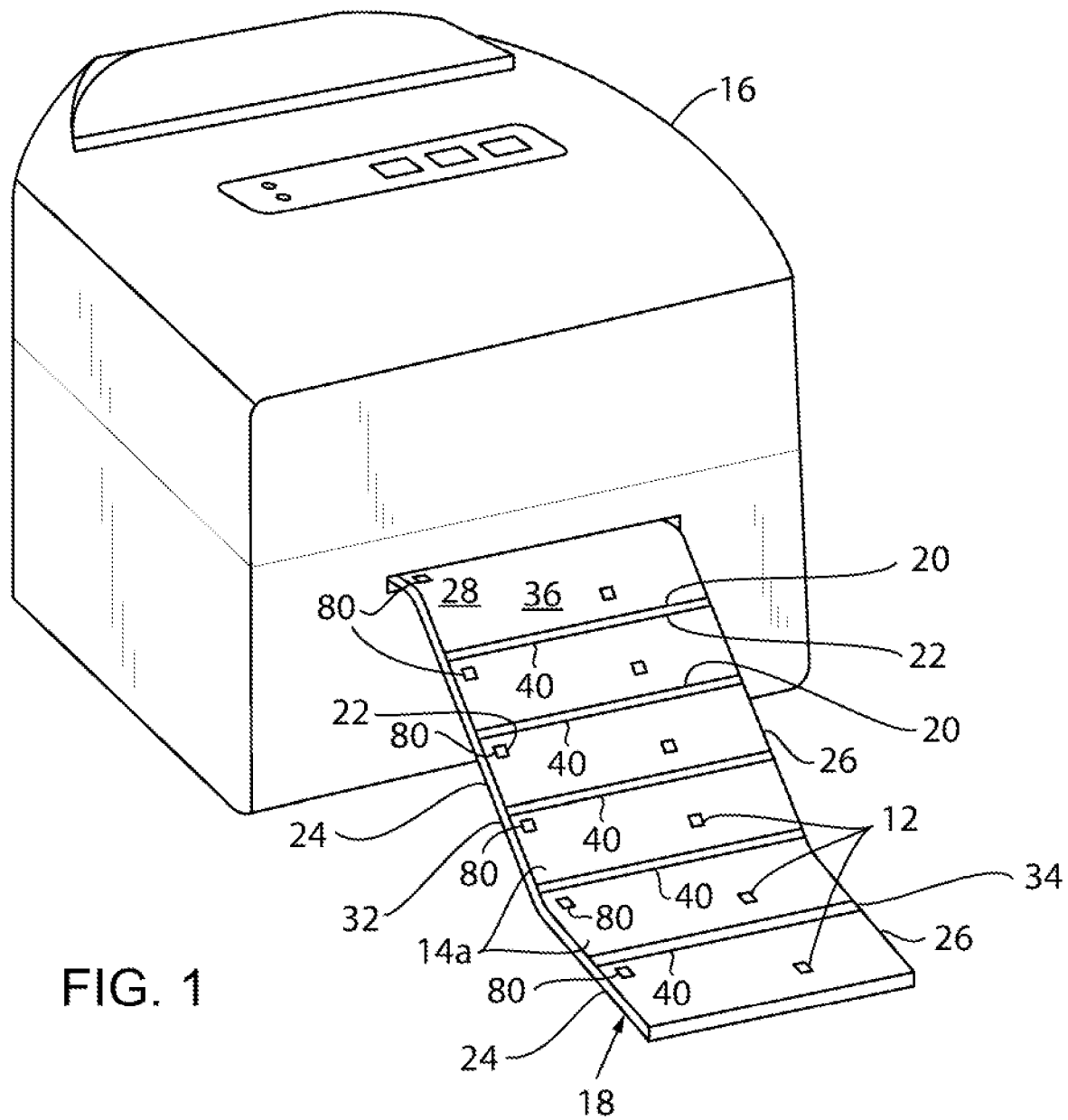
FIG. 1 is a schematic, isometric view showing a step for effectuating a method of authenticating an object in accordance with the present invention.
Figure 2:
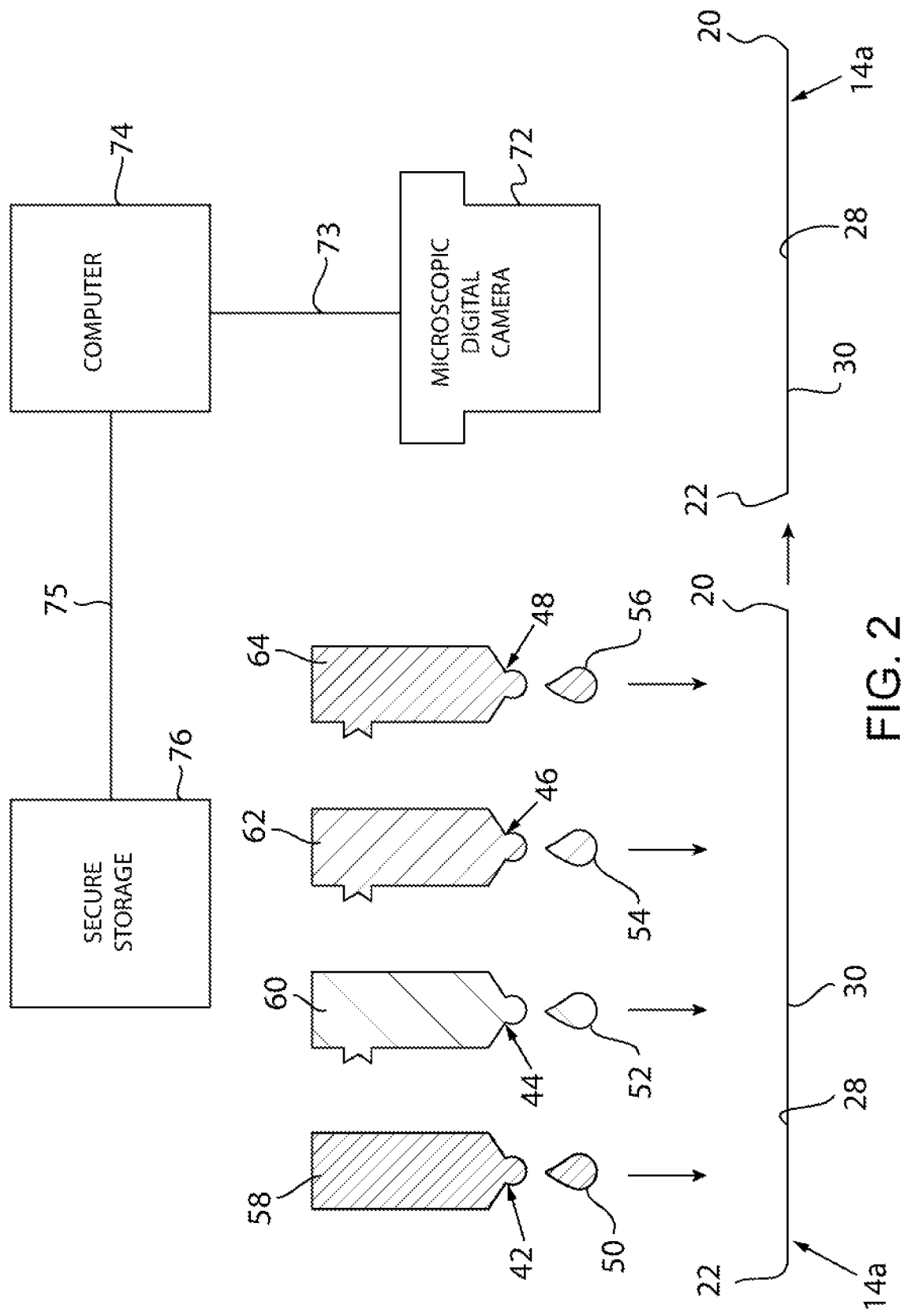
FIG. 2 is a schematic view showing a further step for effectuating a method of authenticating an object in accordance with the present invention.
Figure 3:
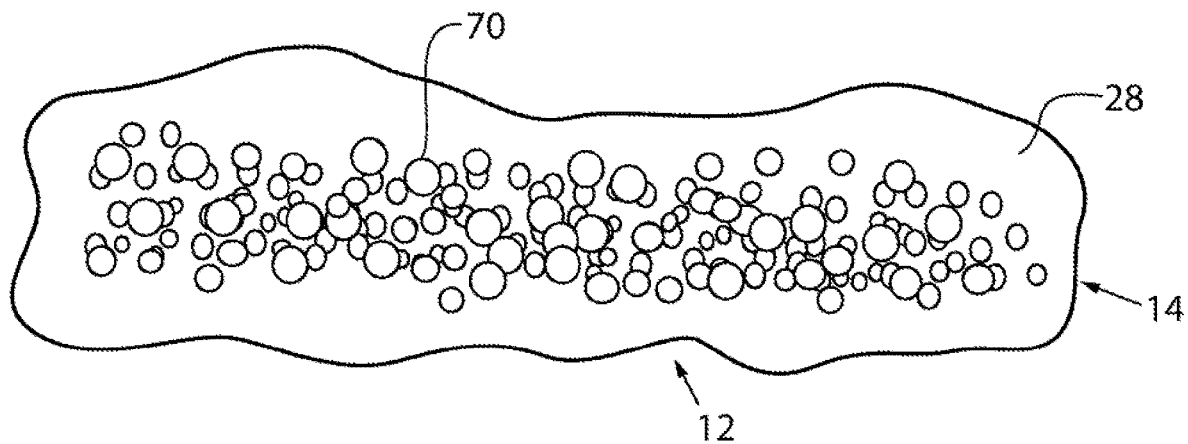
FIG. 3 is an enlarged, top plan view of an authentication mark produced in accordance with the methodology of the present invention.

Referring to FIGS. 1-3, an authentication mark system for facilitating the authentication an object in accordance with the present invention is generally designated by the reference numeral 10. It is intended for authentication mark system 10 to provide an authentication mark 12, FIG. 3, on an object 14. It is contemplated for object 14 to include any material thing that can be seen and touched having a surface on which authentication mark 12 may be printed with an inkjet printer 16. For example, object 14 may take the form of a document, artwork, a sculpture, etcetera. In FIGS. 1-2 of the drawing figures, object 14 has been depicted as banknote 14a. However, it can be appreciated that the printing of authentication mark 12 on other objects is contemplated as being within scope of the present invention.

In the depicted embodiment, it is intended for a web 18 of banknotes 14a to be used in conjunction with an ink jet printer 16. Each banknote 14a is defined by first and second generally parallel sides 20 and 22, respectively, interconnected by first and second generally parallel ends 24 and 26, respectively, perpendicular thereto. Each banknote 14a further includes first surface 28 and second surface 30. It is contemplated for second side 22 of each banknote 14 to be interconnected to first side 20 of an adjacent banknote 14a to form web 18 of banknotes 14a. Perforations 40 may be die cut between second side 22 of each banknote 14a and first side 20 of adjacent banknote 14a of web 18 of banknotes 14a to facilitate the separation of each banknote 14a from web 18 of banknotes 14a.

Referring to FIG. 1, first ends 24 of interconnected banknotes 14a collectively define first edge 32 of web 18 of banknotes 14a and second ends 26 of interconnected banknotes 14a collectively define second edge 34 of web 18 of banknotes 14a. Similarly, first surfaces 28 of interconnected banknotes 14a collectively define first face 36 of web 18 of banknotes 14a and second surfaces 30 of interconnected banknotes 14a collectively define a second face (not shown) of web 18 of banknotes 14a.

As is conventional, inkjet printer 16 includes a plurality of ink cartridges, each of which holding a quantity of ink. Typically, inkjet printer 16 will include at least a black ink cartridge holding black ink, a cyan ink cartridge holding cyan ink, a magenta ink cartridge holding magenta ink and a yellow ink cartridge holding yellow ink. Multiple ink cartridges holding the same color ink or additional ink cartridges holding different colors of ink are possible without deviating from the scope of the present invention. Each ink cartridge is in communication with a plurality of high-precision microscopic nozzles which eject droplets of ink onto an object, e.g. banknote 14a. Referring to FIG. 2, the plurality of high-precision microscopic nozzles in communication with the black ink cartridge is collectively depicted as black nozzle 42; the plurality of high-precision microscopic nozzles in communication with the cyan ink cartridge is collectively depicted as cyan nozzle 44; the plurality of high-precision microscopic nozzles in communication with the magenta ink cartridge is collectively depicted as magenta nozzle 46; and the plurality of high-precision microscopic nozzles in communication with the yellow ink cartridge is collectively depicted as yellow nozzle 48.

As is conventional, black nozzle 42, cyan nozzle 44, magenta nozzle 46 and yellow nozzle 48 are mounted on a moving carriage assembly (not shown) that moves at high velocity back and forth across object 14 to be printed, e.g. banknote 14a. Droplets 50, 52, 54 and 56 of black ink 58, cyan ink 60, magenta ink 62 and yellow ink 64, respectively, are selectively ejected from black nozzle 42, cyan nozzle 44, magenta nozzle 46 and yellow nozzle 48, respectively, by applying pulses of pressure to the selective one or more of black ink 58, cyan ink 60, magenta ink 62 and yellow ink 64 upstream of corresponding black nozzle 42, cyan nozzle 44, magenta nozzle 46 and yellow nozzle 48, respectively, and directed at first surface 28 of object 14, e.g. banknote 14a.

Inkjet printer 16 further includes optical encoders which intended to control the timing and location of the ejection of droplets 50, 52, 54 and 56 of black ink 58, cyan ink 60, magenta ink 62 and yellow ink 64, respectively, from corresponding black nozzle 42, cyan nozzle 44, magenta nozzle 46 and yellow nozzle 48, respectively. It can be appreciated that the timing and location at which droplets 50, 52, 54 and 56 of black ink 58, cyan ink 60, magenta ink 62 and yellow ink 64, respectively, are ejected by corresponding black nozzle 42, cyan nozzle 44, magenta nozzle 46 and yellow nozzle 48, respectively, are crucial to printing an accurate image on first surface 28 of object 14, e.g. banknote 14a, having uniform colors without banding.

Typically, approximately six hundred (600) to twelve hundred (1200) droplets 50, 52, 54 and 56 of black ink 58, cyan ink 60, magenta ink 62 and yellow ink 64, respectively, per inch are directed toward first surface 28 of object 14, e.g. banknote 14a. By varying the ratio of droplets 50, 52, 54 and 56 of black ink 58, cyan ink 60, magenta ink 62 and yellow ink 64, respectively, per inch, various colors of varying intensity may be produced on first surface 28 of object 14, e.g. banknote 14a. Further, as is known, by adjusting the speed of travel of the moving carriage assembly (not shown) on which black nozzle 42, cyan nozzle 44, magenta nozzle 46 and yellow nozzle 48 are mounted during a print operation, the saturation of the ink droplets 50, 52, 54 and 56 may be controlled. In other words, increasing the speed of the moving carriage assembly (not shown) will reduce the saturation of ink on first surface 28 of object 14, while decreasing the speed of the moving carriage assembly (not shown) will increase the saturation of ink on first surface 28 of object 14.

In order to print on image on first surface 28 of object 14, e.g. banknote 14a, it can be understood that droplets 50, 52, 54 and 56 of black ink 58, cyan ink 60, magenta ink 62 and yellow ink 64, respectively, are directed toward first surface 28 of object 14, e.g. banknote 14a, as heretofore described, so as to engage and form printed ink dots 70 on first surface 28 of object 14, e.g. banknote 14a. These droplets have volumes of approximately 1-5 picoliters and diameters in the range of 10 to 20 microliters (μm), FIG. 3. If the speed of travel of the moving carriage assembly is minimized to prevent oversaturation of ink droplets 50, 52, 54 and 56 on first surface 28 of object 14, e.g. banknote 14a, a pattern of ink dots 70 will be produced thereon. It can be appreciated that even in such circumstances when oversaturation of ink droplets 50, 52, 54 and 56 is prevented, any image printed on a surface using the same print-ready file will appear to be identical on the macro-level. However, due to the various forces acting on droplets 50, 52, 54 and 56 of black ink 58, cyan ink 60, magenta ink 62 and yellow ink 64, respectively, as each image is printed, the pattern of printed ink dots 70 forming each images will be different and unique on the micro-level. More specifically, due to the various forces acting on droplets 50, 52.54 and 56 of black ink 58, cyan ink 60, magenta ink 62 and yellow ink 64, respectively, directed toward first surface 28 of object 14, e.g. banknote 14a, by corresponding black nozzle 42, cyan nozzle 44, magenta nozzle 46 and yellow nozzle 48, respectively, such as gravity and the movement of air between black nozzle 42, cyan nozzle 44, magenta nozzle 46 and yellow nozzle 48 and first surface 28 of object 14, e.g. banknote 14a, as well as, other factors including the speed and the size of droplets 50, 52, 54 and 56 ejected by black nozzle 42, cyan nozzle 44, magenta nozzle 46 and yellow nozzle 48, respectively, droplets 50, 52, 54 and 56 of black ink 58, cyan ink 60, magenta ink 62 and yellow ink 64, respectively, engage and dry on first surface 28 of object 14. e.g. banknote 14a, in a random arrangement with random sizes. Therefore, it can be appreciated that the precise arrangement, shape and dimensions of ink dots 70 printed on first surface 28 of a first object 14, e.g. banknote 14a, will be different from the precise arrangement, shape and dimensions of ink dots 70 printed on first surface 28 of any other subsequent object 14, e.g. banknote 14a, FIG. 1, if the identical image is printed by inkjet printer 16 using the same print-ready file to generate the image. As such, it can be understood that the precise arrangement, shape and dimensions of ink dots 70 printed on first surface 28 of object 14 can be used to define authentication mark 12 which is unique and unreproducible. Hence, as hereinafter described, authentication mark 12 may be used to facilitate authentication of object 14, e.g. banknote 14a.

Figure 4:
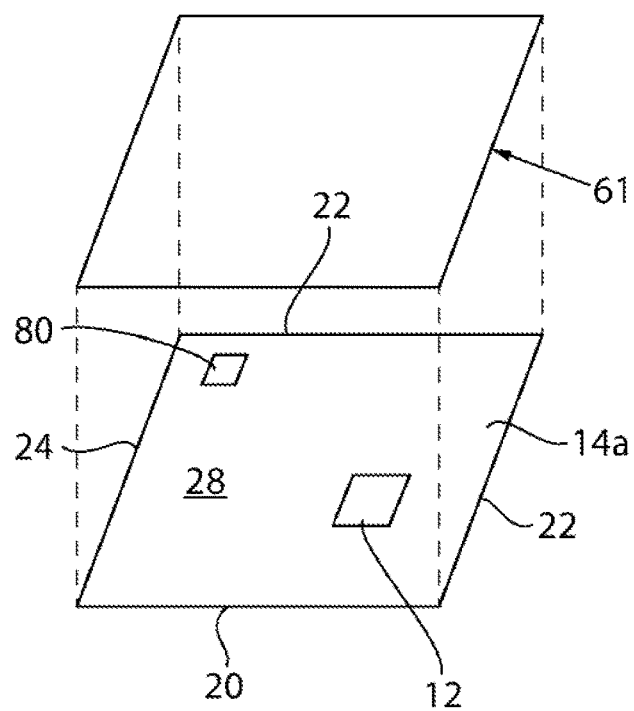
FIG. 4 is an isometric view showing a still further step for effectuating a method of authenticating an object in accordance with the present invention.

Referring to FIG. 4, it is contemplated to provide a coating on first surface 28 of object 14, e.g. banknote 14a, to protect the integrity of authentication mark 12 and prevent damage thereto. For example, the coating may take the form of a veneer deposited on first surface 28 of object 14, e.g. banknote 14a. Alternatively, transparent sheet 61 may be laminated to first surface 28 of object 14, e.g. banknote 14a, so as to overlap authentication mark 12. Transparent sheet 61 may be cover all of or a portion of first surface 28 of object 14, e.g. banknote 14a.

In operation, a print-ready file having all the specifications necessary to produce a high-resolution printed image on object 14 is provided to inkjet printer 16. A user positions object 14, e.g., web 18 of banknotes 14a, within the input of a conventional inkjet printer 16, FIG. 1. As is conventional, each banknote 14a has a unique corresponding serial number or identification code 80 associated therewith. As web 18 of banknotes 14a is fed through inkjet printer 16, authentication code 12, as heretofore described, an identical image in accordance with the print-ready file, is printed on first surface 28 of each banknote 14a of web 18 of banknotes 14a between adjacent perforations 40. Registration marks (not shown) may also be printed on first surface 28 of each banknote 14a of web 18 of banknotes 14a to orientate web 18 of banknotes 14a within inkjet printer 16 so as to insure each authentication code 14 is properly aligned on a corresponding banknote 14a between adjacent registration marks 40.

Once the printing operation on one of the banknotes 14a has been completed, microscopic digital camera 72 is directed at authentication code 12 printed on the corresponding banknote 14a. Microscopic digital camera 72 magnifies authentication mark 12 by a predetermined magnification, e.g., a magnification in the range of 1000× to 2000×, to generate an enlarged image of authentication mark 12. Thereafter, microscopic digital camera 72 captures a digital image of the enlarged view of authentication mark 12. Microscopic digital camera 72 is operatively connected to computer 74 and provides a digital image of the enlarged view of authentication mark 12 to computer 74 in any conventional matter, such as over line 73. Computer 74 is operatively connected to secure media storage 76 in any conventional manner, such as line 75, and uploads the digital image defining authentication code 14 and the corresponding serial number of banknote 14a to secure media storage 76 such as a database for storage. The process is then repeated for each banknote 14a of the web 18 of banknotes 18a, thereby providing a unique authentication code 12 on each backnote 14a. When an individual wishes to authenticate object 14, e.g. banknote 14a, the individual accesses secure media storage 76 to obtain the stored enlarged digital image of authentication mark 12 corresponding to the serial number of banknote 14a. Once the digital image defining authentication code 14 is obtained, the individual magnifies authentication mark 12 on banknote 14a by the predetermined magnification, e.g., a magnification in the range of 1000× to 2000×, which was used by microscopic digital camera 72 to generate the captured enlarged image of authentication mark 12 stored in database 76. The individual then compares the stored enlarged digital image of authentication mark 12 with the magnified authentication mark 12 on banknote 14a, either manually or electronically, to determine the authenticity of banknote 14a. If the stored enlarged digital image of authentication mark 12 does not match the magnified authentication mark 12 on banknote 14a, the individual must conclude that banknote 14a is counterfeit. Alternatively, if the stored enlarged digital image of authentication mark 12 is identical to the magnified authentication mark 12 on banknote 14a, then banknote 14a is authentic.

Alternatively, in order to increase security and prevent tampering with authentication mark 12, it is contemplated to upload a file including the enlarged digital image of authentication mark 12 and the corresponding serial number of banknote 14a to a blockchain. More specifically, the digital file including the enlarged digital image of authentication mark 12 and the corresponding serial number of banknote 14a is uploaded to a blockchain network, e.g. the Interplanetary File System (IPFS), which stores the digital file in a centralized database or in a distributed file storage system. The blockchain network runs the digital file through a secure hash algorithm and a generates a hash unique to the digital file. The hash comprises a series of numbers and letters that do not resemble the original data in the digital file. Once the digital file is hashed, the hash is added to a block and the block is added to a blockchain. It is understood that if someone tampers with the original digital file, any change in the original file results in a completely new hash, different from the hash of the original digital file. As such, the integrity of the digital file including the enlarged digital image of authentication mark 12 and the corresponding serial number of banknote 14a is maintained.

When an individual wishes to authenticate object 14, e.g. banknote 14a, the individual calls for the hash from the blockchain network and receives a copy of the corresponding digital file, thereby allowing the individual access to the stored enlarged digital image of authentication mark 12. The individual magnifies authentication mark 12 on banknote 14a by the predetermined magnification, e.g., a magnification in the range of 1000× to 2000λ, which was used by microscopic digital camera 72 to generate the captured enlarged image of authentication mark 12. The individual then compares the stored enlarged digital image of authentication mark 12 with the magnified authentication mark 12 on banknote 14a, either manually or electronically, to determine the authenticity of banknote 14a. If the stored enlarged digital image of authentication mark 12 does not match the magnified authentication mark 12 on banknote 14a, the individual must conclude that banknote 14a is counterfeit. Alternatively, if the stored enlarged digital image of authentication mark 12 is identical to the magnified authentication mark 12 on banknote 14a, then banknote 14a is authentic.

Various modes of carrying out the invention are contemplated as being within the scope of the following claims particularly pointing out and distinctly claiming the subject matter that is regarded as the invention.

I claim:

1. A method of authenticating an object, comprising the steps of:
    propelling ink droplets onto an object utilizing an inkjet printer to form an arrangement of ink droplets on the object defining a pattern of ink, each ink droplet on the object having a corresponding configuration and dimension;
    capturing an image of the pattern of ink; and
    comparing the arrangement of ink droplets and the configuration and dimension of at least a portion of the ink droplets of the pattern of ink in the captured image to the arrangement of ink droplets and the configuration and dimension of at least a portion of the ink droplets of the pattern of ink on the object.

2. The method of claim 1 comprising the additional step of magnifying the pattern of ink prior to capturing the image such that the captured image is magnified.

3. The method of claim 1 wherein the step of comparing the captured image to the pattern of ink includes the step of magnifying the pattern of ink prior to comparing the captured image to the pattern of ink.

4. The method of claim 1 wherein the ink droplets include a plurality of sets of droplets, each set of droplets fabricated from a different color.

5. The method of claim 4 wherein the color of each set of droplets is selected from a group including black, cyan, magenta and yellow.

6. The method of claim 1 comprising the additional step of storing the captured image as a digital data file.

7. A method of authenticating an object, comprising the steps of:
    propelling ink droplets onto an object utilizing an inkjet printer to form an image, the ink droplets forming a pattern of ink on the object;
    capturing an image of the pattern of ink;
    storing the captured image as a digital data file; and
    comparing the captured image to the pattern of ink;
    wherein the step of storing the captured image as a digital data file includes the additional step of recording the digital data file to a block of a blockchain.

8. The method of claim 1 comprising the additional step of coating the pattern of ink on the object with a protectant.

9. The method of claim 8 wherein the protectant is a transparent sheet laminated to the object and overlapping the pattern of ink.

10. An authentication mark system for authentication of an object having indicia associated therewith, comprising:
    an inkjet printer configured to propel microscopic ink drops onto the object to form a pattern of ink on the object;
    a microscope camera having a lens directable at the pattern of ink on the object, the microscope camera recording an enlarged image of the pattern of ink on the object; and
    a processor operatively connected to the microscope camera and being configured to transmit the enlarged image of the pattern of ink and the indicia associated with the object to a database for secure storage.

11. The authentication mark system of claim 10 wherein the microscopic ink drops include:
    a first set of microscopic ink drops deposited on the object, the first set of microscopic ink drops being a first color;
    a second set of microscopic ink drops deposited on the object, the second set of microscopic ink drops being a second color;
    a third set of microscopic ink drops deposited on the object, the third set of microscopic ink drops being a third color; and
    a fourth set of microscopic ink drops deposited on the object, the fourth set of microscopic ink drops being a fourth color;
    wherein the first, second, third and fourth sets of microscopic ink drops define the pattern of ink on the object.

12. The authentication mark system of claim 10 wherein the processor is configured to transmit the enlarged image of the pattern of ink and the indicia associated with the object to a database as a digital data file which at least partially defines a block of a blockchain.

13. The authentication mark system of claim 10 further comprising a protectant overlapping the pattern of ink formed on the object.

14. The authentication mark system of claim 10 wherein the protectant is a transparent sheet laminated to the object.

15. A method of authenticating object, comprising the steps of:
    providing a unique code for each object; and
    for each object:

propelling ink droplets onto the object utilizing an inkjet printer to form a unique pattern of ink on the object;

magnifying the unique pattern of ink to provide an enlarged pattern of ink;

capturing an image of the enlarged pattern of ink; and transmitting the captured image and the unique code for the object to a secure database.

16. The method of claim 15 wherein the ink droplets include a plurality of sets of droplets, each set of droplets fabricated from a different color.

17. The method of claim 16 wherein the color of each set of droplets is selected from a group including black, cyan, magenta and yellow.

18. The method of claim 15 comprising the additional step of storing the captured image and the unique code for each object in the secured database as a digital data file.

19. The method of claim 18 wherein each digital data file is recorded to a block of a blockchain.

20. The method of claim 15 comprising the additional step of coating each unique pattern of ink with a protectant.

21. The method of claim 20 wherein the protectant is a transparent sheet.

22. The method of claim 15 comprising the additional step of sequentially feeding each object into the inkjet printer prior to the step of propelling ink droplets onto the object.

* * * * *